(12) United States Patent
Ogasawara et al.

(10) Patent No.: US 9,235,354 B2
(45) Date of Patent: Jan. 12, 2016

(54) STORAGE NETWORK SYSTEM AND ITS CONTROL METHOD

(75) Inventors: Hiroshi Ogasawara, Odawara (JP); Takahiro Nakano, Yokohama (JP); Hitoshi Kamei, Sagamihara (JP)

(73) Assignee: HITACHI, LTD., Tokyo (JP)

(*) Notice: Subject to any disclaimer, the term of this patent is extended or adjusted under 35 U.S.C. 154(b) by 1333 days.

(21) Appl. No.: 12/739,862

(22) PCT Filed: Apr. 13, 2010

(86) PCT No.: PCT/JP2010/002674
§ 371 (c)(1),
(2), (4) Date: Apr. 26, 2010

(87) PCT Pub. No.: WO2011/128935
PCT Pub. Date: Oct. 20, 2011

(65) Prior Publication Data
US 2011/0252198 A1 Oct. 13, 2011

(51) Int. Cl.
*G06F 3/06* (2006.01)
*G06F 11/14* (2006.01)

(52) U.S. Cl.
CPC .............. *G06F 3/0649* (2013.01); *G06F 3/061* (2013.01); *G06F 3/0608* (2013.01); *G06F 3/0685* (2013.01); *G06F 11/1446* (2013.01)

(58) Field of Classification Search
None
See application file for complete search history.

(56) References Cited

U.S. PATENT DOCUMENTS

| | | | | |
|---|---|---|---|---|
| 5,634,072 A * | 5/1997 | Allen | ..................... | G06F 9/5077 709/225 |
| 7,680,991 B2 * | 3/2010 | Chodacki | ................. | G06F 3/605 711/154 |
| 7,818,535 B1 * | 10/2010 | Bono | ................... | G06F 12/0868 711/173 |
| 8,239,479 B2 * | 8/2012 | Sagar | ................. | G06F 17/30174 370/503 |
| 8,271,548 B2 * | 9/2012 | Prahlad | ............. | G06F 17/30321 707/812 |
| 2004/0243699 A1 * | 12/2004 | Koclanes | ................ | H04L 29/06 709/224 |
| 2005/0251508 A1 | 11/2005 | Shimizu | | |
| 2006/0053078 A1 | 3/2006 | Yamamoto et al. | | |
| 2006/0064536 A1 * | 3/2006 | Tinker | ................. | G06F 12/0866 711/100 |
| 2006/0101084 A1 * | 5/2006 | Kishi | ..................... | G06F 3/0608 |
| 2007/0185934 A1 * | 8/2007 | Cannon | ............... | G06F 11/1451 |
| 2007/0208788 A1 * | 9/2007 | Chakravarty | ....... | G06F 11/1451 |
| 2007/0220029 A1 | 9/2007 | Jones et al. | | |
| 2008/0010325 A1 | 1/2008 | Yamakawa | | |
| 2009/0144341 A1 * | 6/2009 | Hauck | ................. | G06F 11/1464 |
| 2009/0177699 A1 * | 7/2009 | Rosenblatt | .......... | G06F 21/6218 |
| 2009/0271412 A1 * | 10/2009 | Lacapra | ............. | G06F 17/30206 |
| 2010/0049718 A1 * | 2/2010 | Aronovich | ........ | G06F 17/30115 707/607 |
| 2010/0235542 A1 * | 9/2010 | Visharam | ................ | G06F 15/16 709/246 |
| 2010/0292982 A1 * | 11/2010 | Dube | .................... | G06F 11/201 703/24 |

(Continued)

FOREIGN PATENT DOCUMENTS

| | | |
|---|---|---|
| EP | 1 630 658 A1 | 3/2006 |
| JP | 2004-139471 A | 5/2004 |

(Continued)

*Primary Examiner* — Charles Rones
*Assistant Examiner* — Matthew Chrzanowski
(74) *Attorney, Agent, or Firm* — Mattingly & Malur, PC

(57) ABSTRACT

A storage network system that prevents waste of a core's resources and is thereby operated efficiently, and a method for controlling such a storage network system are provided. Policy differences between a core and a plurality of edges are buffered by enabling hierarchical control of data storage on the side of the plurality of edges in cooperation with hierarchical control of data storage on the core side, and the buffered policy is applied to the hierarchical control of the data storage on the core side.

11 Claims, 18 Drawing Sheets

(56) References Cited

U.S. PATENT DOCUMENTS

2010/0311451 A1* 12/2010 Hirai .................. H04B 7/18578
 455/507
2010/0318748 A1* 12/2010 Ko ...................... G06F 11/1441
 711/147

FOREIGN PATENT DOCUMENTS

| | | |
|---|---|---|
| JP | 2005-322020 A | 11/2005 |
| JP | 2008-015984 A | 1/2008 |
| WO | 2007/088084 A2 | 8/2007 |

* cited by examiner

FIG.4

| # | MAJOR ITEM | SUB-ITEM | | SUB-SUB-ITEM |
|---|---|---|---|---|
| 1 | EDGE INFORMATION | EDGE NAME | | - |
| 2 | | TIER 1 CAPACITY | | - |
| 3 | | TIER 2 CAPACITY | | - |
| 4 | | TIER 3 CAPACITY | | - |
| 5 | FILE STORAGE TERM | TIER 1 STORAGE TERM | BY FILE TYPE | FILE CREATION DATE |
| 6 | | | | FILE ACCESS DATE |
| 7 | | | | FILE ACCESS FREQUENCY |
| 8 | | TIER 2 STORAGE TERM | BY FILE TYPE | FILE CREATION DATE |
| 9 | | | | FILE ACCESS DATE |
| 10 | | | | FILE ACCESS FREQUENCY |
| 11 | | TIER 3 STORAGE TERM | BY FILE TYPE | FILE CREATION DATE |
| 12 | | | | FILE ACCESS DATE |
| 13 | | | | FILE ACCESS FREQUENCY |
| 14 | METHOD OF TRANSFER TO CORE | TIER1/2/3 | | - |
| 15 | ACTION TO BE TAKEN UPON CAPACITY SHORTAGE | EDGE SIDE | | - |
| 16 | | CORE SIDE | | - |
| 17 | POLICY IMPLEMENTATION TIME | SPECIFIED TIME | | - |

FIG. 5

| # | MAJOR ITEM | SUB-ITEM |
|---|---|---|
| 1 | FILE TYPE | - |
| 2 | FILE BASIC INFORMATION | FILE CREATOR NAME |
| 3 | | FILE ACCESS RIGHT |
| 4 | | FILE CREATION DATE |
| 5 | | FILE ACCESS DATE |
| 6 | FILE EXTENSION INFORMATION | PATIENT INFORMATION |
| 7 | | CASE NAME OF THE RELEVANT FILE |
| 8 | | IMPORTANCE LEVEL OF THE FILE |
| 9 | | WORM ATTRIBUTE |
| 10 | STATISTICAL INFORMATION | ACCESS FREQUENCY |

FIG. 6

| # | MAJOR ITEM | SUB-ITEM |
|---|---|---|
| 1 | CORE-SIDE BASIC POLICY FILE 1 | |

← 600

| # | MAJOR ITEM | SUB-ITEM |
|---|---|---|
| 1 | CORE-SIDE BASIC POLICY FILE 2 | |

← 602

| # | MAJOR ITEM | SUB-ITEM |
|---|---|---|
| 1 | EDGE-SIDE POLICY (COPY) FILE | RECEIVED DATA (COPY) FROM EDGE 1 |
| 2 | | RECEIVED DATA (COPY) FROM EDGE 2 |
| 3 | | RECEIVED DATA (COPY) FROM EDGE 3 |
| 4 | | ... |

← 604

| # | MAJOR ITEM | SUB-ITEM |
|---|---|---|
| 1 | EDGE POLICY FILE | FOR EDGE 1 |
| 2 | | FOR EDGE 2 |
| 3 | | FOR EDGE 3 |
| 4 | | ... |

| # | MAJOR ITEM | SUB-ITEM | | SUB-SUB-ITEM |
|---|---|---|---|---|
| 1 | CORE INFORMATION | TIER 1 CAPACITY | | - |
| 2 | | TIER 2 CAPACITY | | - |
| 3 | | TIER 3 CAPACITY | | - |
| 4 | FILE STORAGE TERM | TIER 1 STORAGE TERM | BY FILE TYPE | FILE CREATION DATE |
| 5 | | | | FILE ACCESS DATE |
| 6 | | | | FILE ACCESS FREQUENCY |
| 7 | | TIER 2 STORAGE TERM | BY FILE TYPE | FILE CREATION DATE |
| 8 | | | | FILE ACCESS DATE |
| 9 | | | | FILE ACCESS FREQUENCY |
| 10 | | TIER 3 STORAGE TERM | BY FILE TYPE | FILE CREATION DATE |
| 11 | | | | FILE ACCESS DATE |
| 12 | | | | FILE ACCESS FREQUENCY |
| 13 | | TOTAL STORAGE TERM | BY FILE TYPE | FILE CREATION DATE |
| 14 | | | | FILE ACCESS DATE |
| 15 | | | | FILE ACCESS FREQUENCY |
| 16 | POLICY IMPLEMENTATION TIME | SPECIFIED TIME | | - |

FIG. 8

| # | MAJOR ITEM | SUB-ITEM | SUB-SUB-ITEM |
|---|---|---|---|
| 1 | EDGE INFORMATION | EDGE-SIDE TIER 1 TOTAL CAPACITY | - |
| 2 | | EDGE-SIDE TIER 2 TOTAL CAPACITY | - |
| 3 | | EDGE-SIDE TIER 3 TOTAL CAPACITY | - |

FIG. 9

| # | MAJOR ITEM | SUB-ITEM | SUB-SUB-ITEM |
|---|---|---|---|
| 1 | EDGE INFORMATION | EDGE NAME | - |
| 2 | | EDGE AREA | EDGE DIRECTORY NAME |
| 3 | | | TIER 1 CAPACITY UPPER LIMIT |
| 4 | | | TIER 2 CAPACITY UPPER LIMIT |
| 5 | | | TIER 3 CAPACITY UPPER LIMIT |
| 6 | FILE STORAGE TERM | TIER 1 STORAGE TERM | BY FILE BASIC INFORMATION |
| 7 | | | BY FILE STATISTICAL INFORMATION |
| 8 | | TIER 2 STORAGE TERM | BY FILE BASIC INFORMATION |
| 9 | | | BY FILE STATISTICAL INFORMATION |
| 10 | | TIER 3 STORAGE TERM | BY FILE BASIC INFORMATION |
| 11 | | | BY FILE STATISTICAL INFORMATION |
| 12 | ACTION TO BE TAKEN UPON CAPACITY SHORTAGE | CORE SIDE | - |

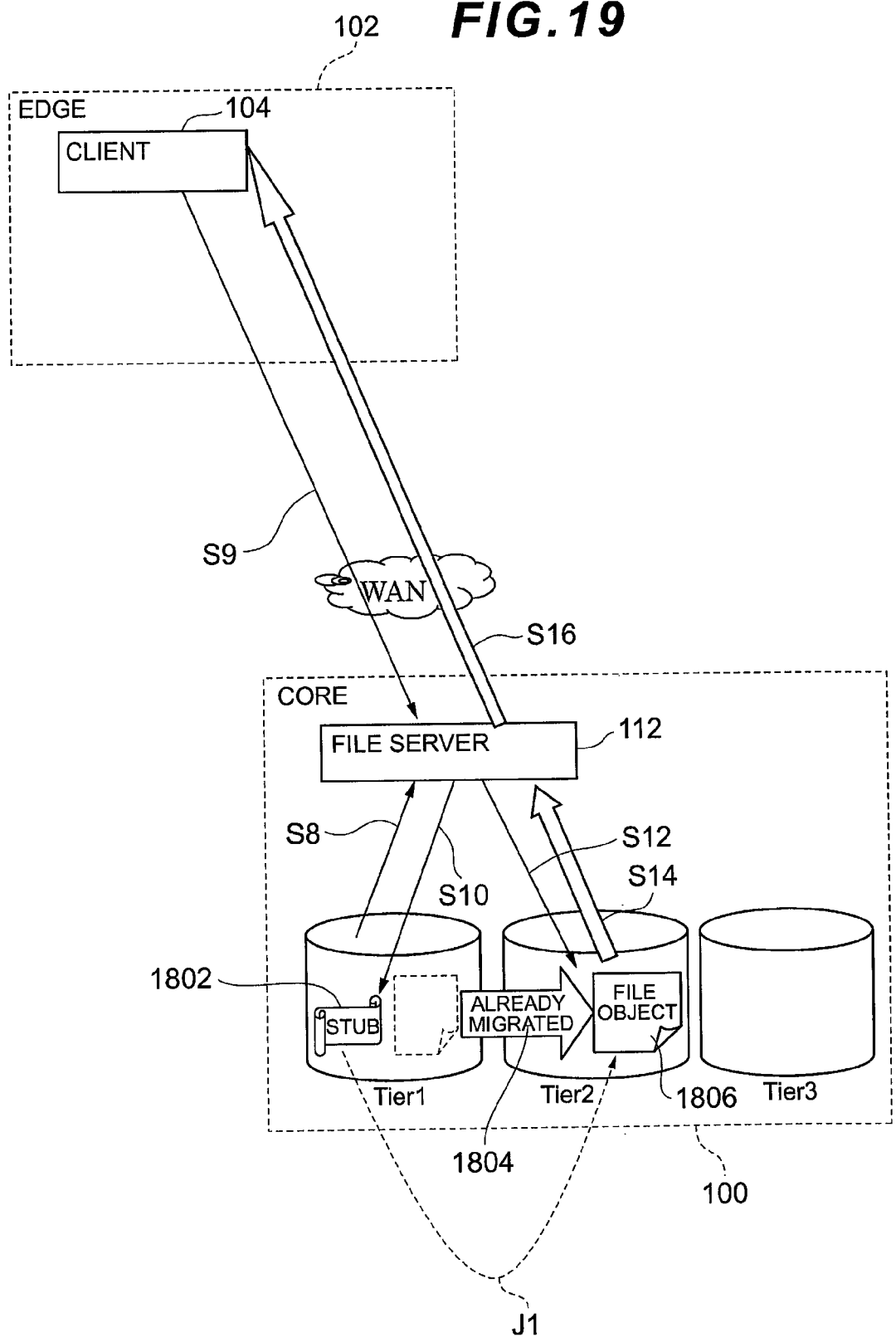

STORAGE NETWORK SYSTEM AND ITS CONTROL METHOD

TECHNICAL FIELD

The present invention relates to a storage network system. Particularly, the invention relates to a system in which edges and a core are connected via a network.

BACKGROUND ART

A system constituted from a core and edges is known as one form of storage network systems. In this system, a plurality of storage sites are connected to each other via a network and a site playing a central role is the core and sites other than the core are the edges. As a specific form of the core-edge system, there is an example where a core is a data center and edges are remote offices.

A data file is first created at an edge and the core plays a role to intensively back up and archive data and files in the plurality of edges. File operations such as creation, use, and manipulation of files are executed by the edges. Therefore, a storage system existing at the edge is connected to a plurality of client terminals.

Furthermore, as a specific form of the core-edge system, there is a medical data management system at hospitals. Edges are medical institutions of various sizes and a core is a large-scale data center that is established by the administrative authorities and exists in a local community.

The core plays a role to receive medical data from each hospital, which is the edge, and back up and archive the received medical data, or enable reference to the medical data from other hospitals.

Hierarchical Storage Management (HSM) is applied in order to enhance efficiency of data management at both the edge and core sites. For example, a means of recognizing a series of actions involving creation, utilization, storage, and disposal of digital data as a life cycle and using an optimum storage unit, from among multiple tiers such as 1st Tier (first tier) (online), 2nd Tier (second tier) (near-line), and 3rd Tier (third tier) (archive), as appropriate at different times for the hierarchical management of the data according to an availability value of the data that changes over time is realized.

Incidentally, as conventional techniques relating to this invention, there are techniques disclosed in Japanese Patent Laid-Open (Kokai) Application Publication No. 2004-139471 and Japanese Patent Laid-Open (Kokai) Application Publication No. 2005-322020.

CITATION LIST

Patent Literature

PTL 1: Japanese Patent Laid-Open (Kokai) Application Publication No. 2004-139471
PTL 2: Japanese Patent Laid-Open (Kokai) Application Publication No. 2005-322020

SUMMARY OF INVENTION

Technical Problem

The most important thing in realizing the core-edge system is to establish an integrated policy for data storage management and operate the storage network efficiently based on that policy.

It is inevitable that policies for the respective edges may have differences among a plurality of edges; and, in a conventional storage network system, excessive policies are set to the core in order to compensate the differences, so control resources and storage resources for the core are wasted needlessly and the storage network cannot be operated efficiently.

Therefore, it is an object of the present invention to provide a storage network system that prevents waste of a core's resources and is thereby operated efficiently, as well as a method for controlling such a storage system.

Solution to Problem

In order to achieve the above-described object, this invention is characterized in that policy differences between a core and a plurality of edges are buffered by enabling hierarchical control of data storage on the side of a plurality of edges in cooperation with hierarchical control of data storage on the core side, and the buffered policy is applied to the hierarchical control of the data storage on the core side.

Advantageous Effects of Invention

As described above, this invention makes it possible to provide a storage network system that prevents waste of a core's resources and is thereby operated efficiently, as well as a method for controlling such a storage system.

BRIEF DESCRIPTION OF DRAWINGS

FIG. 4 is a table indicating the configuration of the edge's policy file.
FIG. 5 is a table indicating the configuration of metadata of a medical data file.
FIG. 6 is a table indicating the configuration of the core's policy files.
FIG. 7 is a table indicating the configuration of a basic policy file 1 set by the core.
FIG. 8 is a table indicating the configuration of a basic policy file 2 set by the core.
FIG. 9 is a table indicating the configuration of a policy file for each edge as set by the core.

FIG. 19 is a block diagram when the edge accesses backup data of another edge.

REFERENCE SIGNS LIST

100 Core
102 Edge
108, 112 File servers
220, 222, 320, 322 Storage apparatuses
Tier 1 First storage tier
Tier 2 Second storage tier
Tier 3 Third storage tier
106, 110 Management terminals

DESCRIPTION OF EMBODIMENTS

Figure 1:
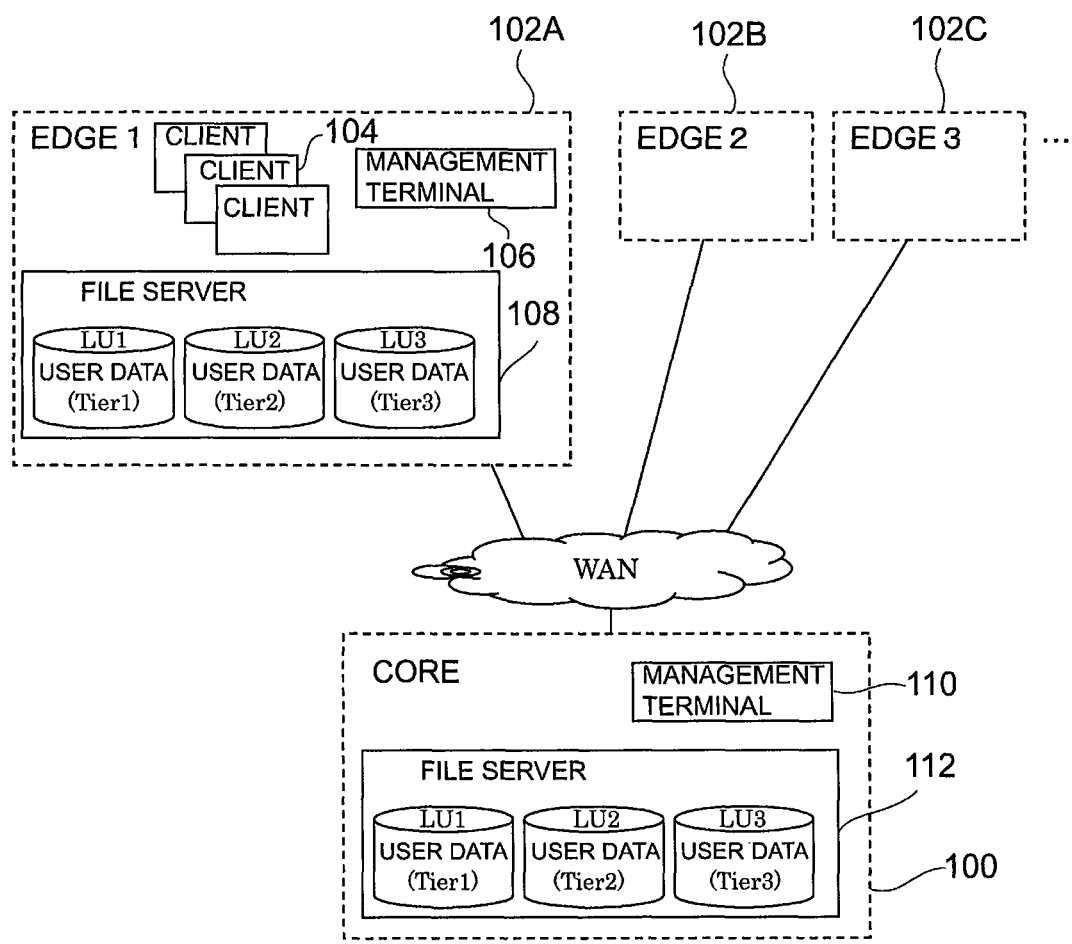
FIG. 1 is a block configuration diagram of a storage network according to an embodiment of the present invention.

Next, an embodiment of the present invention will be explained. FIG. 1 shows the block configuration of a storage network according to an embodiment of this invention. This system is configured so that a plurality of storage systems are connected to each other via a network such as a WAN.

Among the plurality of storage systems, a site that exists at the center of the communication system and is composed of a storage system playing a central role such as a data center is a core 100; and sites composed of other storage systems are edges 102.

Referring to FIG. 1, reference numeral "102A" represents a storage system constituting a site of edge 1, "102B" represents a storage system constituting a site of edge 2, and "102C" represents a storage system constituting a site of edge 3.

The hardware and software configuration of a storage system constituting an edge and that of a storage system constituting a core are not significantly different from each other, except that the former is an edge and the latter is a core.

The storage system constituting the edge 102A is equipped with a file server 108 as a storage control device and a management terminal 106. A plurality of client computers 104 are connected to the file server (NAS) 108. The storage system 102A includes storage apparatuses (reference numerals "220" and "222" in FIG. 2) connected to the file server 108 as described later. The storage apparatus serving as a storage control device manages user data by dividing them into plurality of tiers.

The file server 108 provides a plurality of logical devices (LU: Logical Units), each of which corresponds to the above-mentioned storage tier, to the client apparatus 104. As the logical devices, there are LU1 that is set to a first tier (Tier 1) of the storage apparatus; LU2 that is set to a second tier (Tier 2) of the storage apparatus; and LU3 that is set to a third tier (Tier 3) of the storage apparatus. The client apparatus 104 accesses each tier, which is a storage area of the storage apparatus for user data, via the logical device.

Also, the storage system 100 constituting the core is equipped with a file server 112 and a management terminal 110 in the same manner as the edge. The storage system 100 also includes storage apparatuses (reference numerals "320" and "322" in FIG. 3) connected to the file server 112 as described later.

The storage apparatus manages user data backed up from the plurality of edges by dividing them into a plurality of tiers. The file server 112 provides a plurality of logical devices LU, each of which is composed of a storage tier, to the client apparatus 104 or the file server 108 for the edge 102. The client apparatus 104 can access data existing in the storage apparatuses for the edge via the logical devices for the edge 102, as well as backup data existing in the storage apparatuses for the core 100 after the above-mentioned data is backed up to the core 100. After the data is migrated to the core, this data is accessed by the client not via the logical devices, but via the file server 108, or directly via the WAN.

The storage apparatus existing in each of the plurality of edges 102 and the core 100 stores data by classifying them into a plurality of tiers based on a hierarchical storage management structure. For example, the hierarchical storage structure is to recognize a series of actions involving creation, utilization, storage, and disposal of digital data as a life cycle and categorize and store the data into a plurality of tiers in order, such as 1st Tier (first tier), 2nd Tier (second tier), and 3rd Tier (third tier), according to an availability value of the data that changes over time.

A storage area in the first tier is composed of an online storage apparatus that is frequently accessed by clients. An example of the online storage apparatus is a hard disk drive using Fibre Channel or serial attached SCSI as a built-in interface. As another example, an SSD (Solid State Disk) (which is a high-speed device using so-called a "flash memory") may be used. A storage area of the third tier is composed of a medium suited for archives such as a tape drive.

The second tier is provided by, for example, a hard disk drive using ATA or SATA as a built-in interface, that is an intermediate medium between the server-oriented "online" storage apparatus (, which is frequently accessed or updated by the client computers 104, and the "archive" medium such as a tape drive suited for long-term data storage, and is generally used in terms of reliability. Each of the plurality of tiers is turned into a logical form as the above-mentioned logical volume (LDEV), associated with the logical device in the file server, and provided to the client apparatuses.

If the file servers 108, 112 determine that certain conditions specified in the relevant policies are satisfied, they migrate file data in the first tier (1st Tier) to the second tier (2nd Tier). Similarly, if the file servers determine that other conditions specified in the relevant policies are satisfied, they migrate the file data in the second tier to the third tier (3rd Tier).

Figure 2:
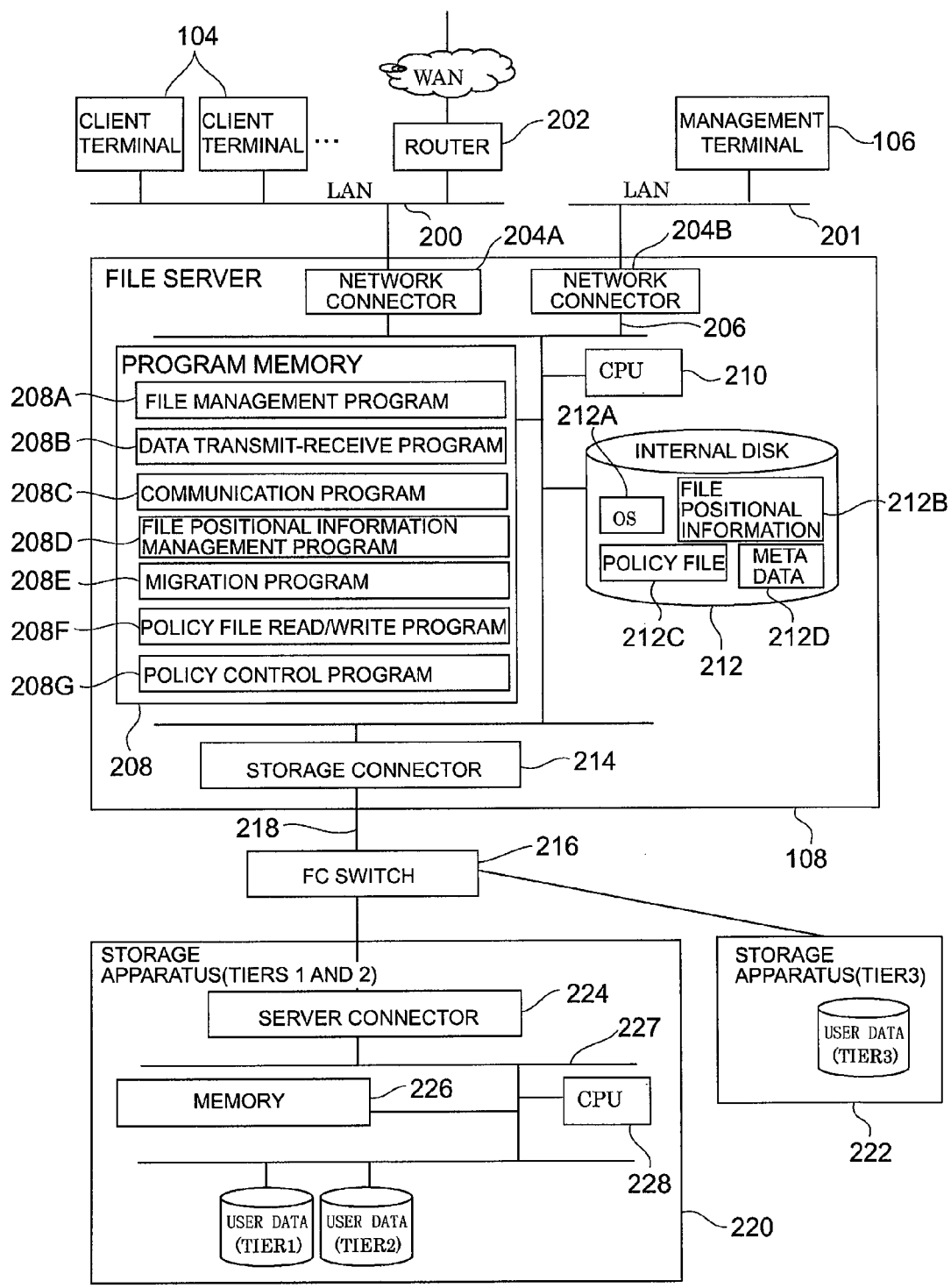
FIG. 2 is a hardware block diagram of a storage system constituting an edge.

FIG. 2 is a hardware block diagram of the storage system constituting the edge (102A in FIG. 1). The storage system is equipped with the file server 108 and a plurality of storage apparatuses 220, 222.

The file server 108 is connected via LANs 200, 201 to the client terminals 104, a router 202 for connection to a WAN, and the management terminal 106. The WAN is connected to the edges 102B, 102C, and so on or the core 100 as described earlier with reference to FIG. 1.

The management terminal 106 fulfills a function that sets a policy file to the file server 108 or changes or updates the set policy file.

The file server 108 includes network connectors 204A, 204B, a program memory 208, an arithmetic processing unit 210, an internal disk device 212, and a storage connector 214.

Each network control unit 204A, 204B includes a LAN adapter and is an interface for controlling connection with the LAN. The network connector 204A is connected to the LAN 200, and the network connector 204B is connected to the LAN 201.

The program memory 208 includes a file management program 208A, a data transmit-receive program 208B, a communication program 208C, a file positional information management program 208D, a migration program 208E, a policy file read-write program 208F, and a policy control program 208G. The arithmetic processing unit executes these programs and realizes various functions that the respective programs are intended to fulfill.

The file management program 208A fulfills various functions to treat data stored in the storage apparatuses 220, 222 as files. For example, the file management program 208A creates and manages metadata of files, turns a storage area of the storage apparatus into a logical form, that is, a logical storage area, provides the logical storage area to the file server, fulfills a capacity-limiting function for each directory of the files, and controls read and/or write of files with a WORM (Write Once Read Many) attribute.

The data transmit-receive program 208B sends or receives the data and metadata via the network connectors 204A, 204B and the storage connector 214. Furthermore, the data transmit-receive program 208B sends a policy file to the core 100.

The communication program 208C fulfills various functions relating to communication with the management terminal 106 and the core 100. For example, the communication program 208C receives a command from the management terminal 106 to create a policy file. The communication program 208C further communicates with the file server for the core 100 and checks the update status of a policy file 212C.

The file positional information management program 208D migrates the data according to the relevant policy and then manages information relating to the storage apparatus and LU where the relevant file exists.

The migration program 208E migrates the data between the plurality of tiers according to the relevant policy. The policy file read-write program 208F collaborates with the communication program 208C to create and update the policy file 212C. The policy file read-write program 208F further updates the policy file in accordance with a command from the core 100. The policy control program 208G judges whether to rewrite the policy file, and then rewrites the policy by giving a command to the policy file read-write program 208F.

The internal disk device 212 has an OS 212A for executing a file service, file positional information 212B, a policy file 212C, and an area for storing metadata 212D. The file positional information is information for identifying, for example, an LU and directory indicating the position where the relevant file actually exists when data migration is performed between a plurality of storage tiers.

The storage connector 214 is an interface for controlling transmission and reception of data between the storage apparatuses 220, 222 via a Fibre Channel network 218. A Fibre Channel switch 216 is provided between the storage apparatuses 220, 222 and the storage connector 214 for the file server 108.

The Fibre Channel switch 216 decides which storage apparatus from among the plurality of storage apparatuses is to be connected by the file server 108, according to a command sent from the file server 108 and switches to the decided storage apparatus. Incidentally, the file server 108 further has a cache memory as a temporary storage area for data.

Various elements and circuits such as the program memory 208 and the arithmetic processing unit 210 described above are connected to each other via a system bus 206.

The storage apparatus 220 is equipped with a server connector 224 for connection with the Fibre Channel switch 216, a system memory 226 for executing temporary storage processing on programs and data for executing control processing for categorizing and storing file data in the plurality of tiers, an arithmetic processing circuit 228 for executing control programs and processing data, and a system bus 227 for mutual connection between the above-mentioned components.

Furthermore, the storage apparatus 220 provides the file server 108 with storage areas composed of the aforementioned plurality of tiers. Tier 1 is a logical area for providing the file server 108 with storage devices belonging to the first tier, Tier 2 is a logical area for providing the file server 108 with storage devices belonging to the second tier, and Tier 3 is a logical area for providing the file server 108 with storage devices belonging to the third tier.

If the edge is a system existing in each medical institution, an example of the client apparatus would be a computer connected to a medical diagnosis apparatus. Medical data such as X-ray image data from client apparatuses are first stored in Tier 1. Tier 2 is an area to which data regarding which certain conditions specified in the relevant policy are satisfied, for example, data whose specified term after storage in Tier 1 has expired, or data whose access frequency from the client apparatuses has decreased, are migrated.

Tier 3 is also an area to which data regarding which conditions specified in the relevant policy are satisfied are migrated from Tier 2. Incidentally, direct data migration from Tier 1 to Tier 3 will not be precluded.

A storage device(s) constituting each tier may exist in one storage apparatus or be divided into and separately exist in a plurality of storage apparatuses. In the form shown in FIG. 2 and FIG. 3, the online storage device (Tier 1) and the near-line storage device (Tier 2) exist in the first storage apparatus 220, while the archive storage device (Tier 3) exists in the second storage apparatus 222.

Figure 3:
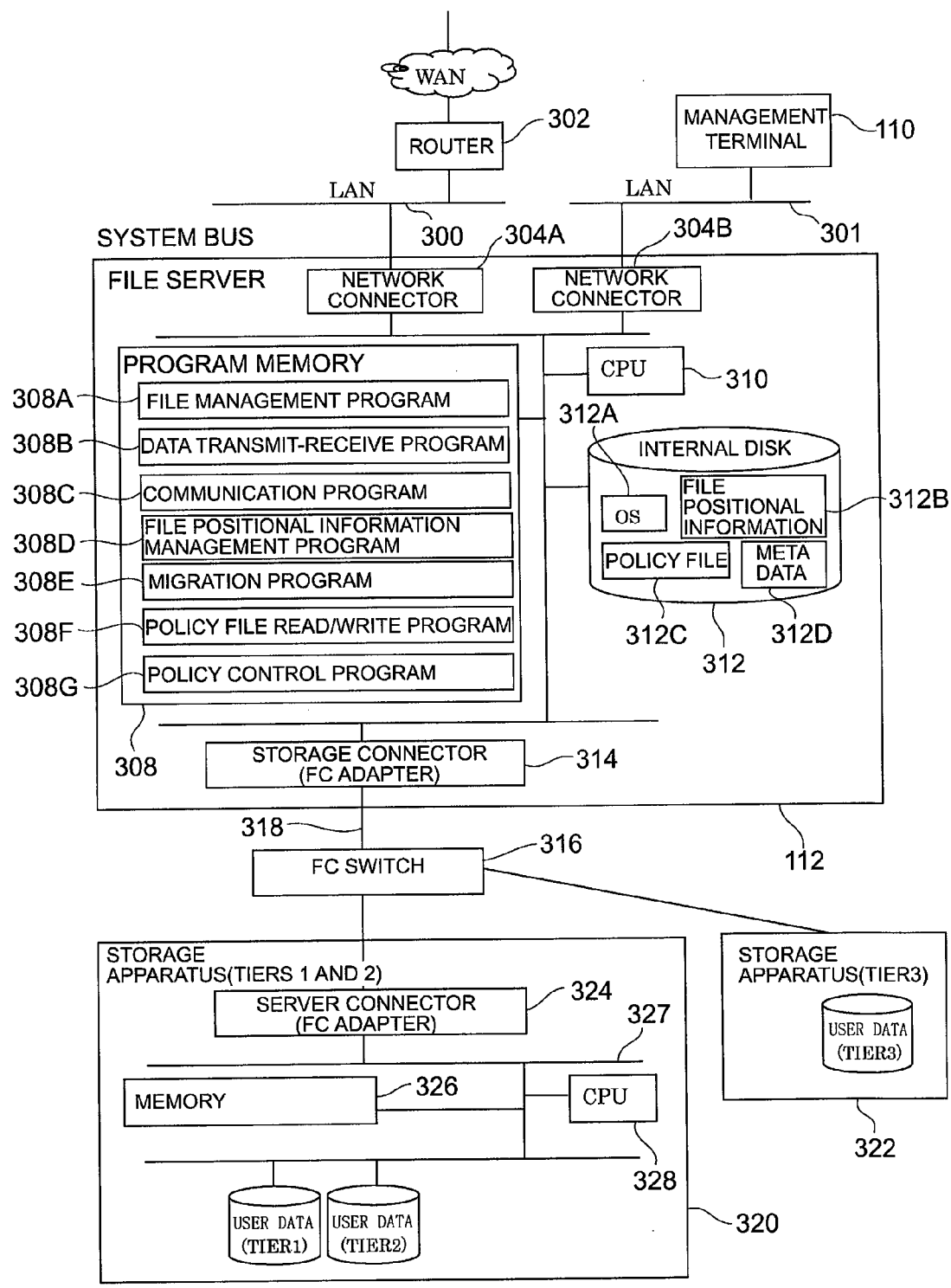
FIG. 3 is a hardware block diagram of a storage system constituting a core.

FIG. 3 is a hardware block diagram of the storage system 100 forming the core. Since this is almost the same as the hardware block (FIG. 2) of the storage system forming the edge, only the difference between them will be explained below.

The storage system 100 which is the core manages backup data sent from the edges 102 by categorizing the backup data hierarchically. A LAN 300 is not connected to any client apparatus. The WAN is connected to the edges.

A data transmit-receive program 308B receives the policy file 212C from the edge 102. A communication program 308C communicates with the file server 108 for the edge 102 and checks the update status of the policy file 312C. A policy file read-write program 308F updates a policy file 312C for the core according to the policy file 212C obtained from the edge 102. Medical image data received from the edge 102 are first stored in Tier 1 in a storage apparatus 320.

Hierarchical data management is realized as described above at each of the core 100 and the edges 102 by the arithmetic processing unit 210, 310 referring to the relevant policy and executing various control programs in the program memory 208, 308.

The policy is an arrangement, such as regulations or rules, for hierarchical data control at each of the edges 102 and the core 100 and is a group of commands regarding, for example, when the storage system should locate what kind of files in which tier, how long the storage term of the data in each tier should be, and how much storage areas in the core should be allocated to each of the plurality of edges. The policy for the edge 102 is determined independently for each of the plurality of edges and is defined so that the edges will not depend on each other. Incidentally, association of the policies between specified edges will not be precluded.

On the other hand, since the core 100 plays a role as a data center for the edges 102, the core's policy is originally a unique policy for the core. This policy is decided, for example, based on an agreement about the level of services to be provided by the entire system to the user. This agreement is called a Service Level Agreement (SLA) and is made based on, for example, a Recovery Point Objective (RPO) that guarantees the maximum interval of backup frequency, and a Recovery Time Object (RTO) that guarantees recovery time when a failure occurs in the system. The unit of the recovery point objective and recovery time object is time, so that values such as one day for the recovery point objective (a backup is to be created at least once a day) and one hour for the recovery time object (data should be recovered within one hour when a failure occurs) are decided, respectively. The core according to this invention has a function that reflects the policies of the plurality of edges in the core's policy.

For example, the core 100 finds a difference between the core's own policy and the edge's policy with regard to each of the plurality of edges, creates a policy for each edge by compensating each edge's policy for this difference, and applies the created policy as each edge policy file of the core to each edge. Alternatively, the core 100 applies rules applicable to the plurality of edges as the core's policy to the plurality of edges. As described above, the core makes an attempt to optimize the policies for the plurality of edges.

An administrator of the edge 102 sets a policy on the management terminal 106 and stores the set policy as the policy file 212C in the internal disk device 212. The file server 108 refers to the policy file 212C and executes hierarchical management of the user data.

An administrator of the core's system 100 first sets a basic policy on the management terminal 110 and stores it as a policy file in the internal disk device for the file server. Furthermore, the server 112 obtains the policy file from the edge 102 and copies it to the internal disk. Therefore, the policy file 312C includes the core-side policy file set by the core 100 and the edge-side policy file set by each edge 102. The core sets a policy to be applied to each edge based on the both types of the above-mentioned policy files or modifies the above-mentioned policy files to set each edge policy file.

The reason why the core's policy is made to depend on the edges' policies is, for example, as described below. Assuming that the edges are hospitals and the core is a data center organizing medical data in a local community, as a general rule, the scale of the edge system varies from one hospital to another and the policy also varies from one edge to another. For example, the policy for the edge 1 defines that the data should be stored for two years, while the policy for the edge 2 defines that the data should be stored for three years.

Incidentally, it is stipulated by law that a storage term of medical data such as X-ray images is, for example, ten years. If the core 100 system is to retain the data in the plurality of edges 102 for the statutory period of time, it is necessary to consider differences between the edges' policies and have the core set a policy that satisfies the statutory requirement, and manage the data accordingly.

Specifically speaking, the policy of the core 100 defines that data sent from the edge 1 should be stored for a total of ten years by adding a storage term on the core side to the period of time for which the data has been stored at the edge 1, and the same procedures should be taken for the edge 2. As the core system 100 creates or updates the core's policy based on the edges' policies, it is possible to comply with the obligation concerning the statutory data storage term with regard to all the edges.

Next, the policy file for the edge 102 will be explained. The policy file, whether the edge-side or the core-side, is a group of commands regarding the control and management programs in the program memory with regard to hierarchical management of file data, migration of the file data, and transmission and reception of the file data.

FIG. 4 is a table explaining the configuration of the edge's policy file. The policy file set by the edge for its own storage management will be hereinafter referred to as the "edge-side policy file."

The edge-side policy file is composed of a major item, a sub-item, and a sub-sub-item. The major item is constituted from a plurality of blocks indicating edge information, a file storage term, a method of transfer to the core, an action to be taken upon capacity shortage, and policy execution time.

Among the above-listed blocks, the "capacity" of the edge (#2 to #4) and the "file storage term" (#5 to #13) are set for each tier and the storage term is further set for each file type.

The "file type" indicates, for example, in the medical field, the distinction between image files such as X-ray images, clinical record information, text files, and annotation files. The file server 108 judges the file type by recognizing an extension of the relevant file. For example, the image data are stored in Tier 1 for a long period of time.

The "method of transfer to the core" (#14) defines when the edges 102 should transfer the user data to the core 100 in order to back up the user data. For example, the edge-side file server 108 first stores the data in the first tier (Tier 1) in the storage apparatus 220, then migrates this data to the second tier (Tier 2), and further migrates the data in the second tier (Tier 2) to the third tier (Tier 3) in the storage apparatus 222; and the timing of data transfer to the core is decided according to the "method of transfer to the core."

For example, after the edge 102 migrates the data from the second tier to the third tier on the edge, the data is backed up to the core side before the expiration of a specified data storage term on the edge. Alternatively, when the edge completes migration of the data from the first tier to the second tier (or possibly from the second to the third tier), the data may be backed up to the core as triggered by the completion of the migration.

The "action to be taken upon capacity shortage" (#14) is the rule to decide an action to be taken upon shortage of the storage capacity on the edge side. As the "action to be taken upon capacity shortage," there are a pattern of forced termination of a write request from a client by means of an error, and a pattern of forced shortening of the data storage term in a specified tier and then acceptance of the write request.

An example of the latter case is the situation where the storage capacity is deficient in the first tier. In this case, the file server 108 shortens the data storage term in the first tier to migrate the data to the second tier earlier and promptly release the storage area in the first tier. The management terminal 106 provides the administrator with a plurality of patterns and the administrator can select one or more of the plurality of patterns. The same action is taken in the case of shortage of the storage capacity in the second tier. Specifically speaking, the data storage term in the second tier is shortened. On the other hand, when the storage capacity in the third tier is deficient, the data storage term(s) in the first storage tier and/or the second storage tier is increased. If the capacity of these storage tiers is deficient, the management terminal obtains deficient information from the file server and provides the administrator with a message necessary to add the storage capacity. When the data storage term or the storage capacity is updated or changed, the file server updates the edge-side policy file.

The "action to be taken upon capacity shortage" (#15) can request processing of a specified pattern on the core side, too. The specified pattern includes a request for shortening of the data storage term as described above or a request from the edge to the core for allocation of the storage capacity to that edge. When making these change requests, the administrator of the edge 102 designates a post-change rate on the management terminal 106.

The "policy execution time" (#17) is used to have the migration program 208E for the edge determine when the file data should be migrated at which time interval, for example, at designated time every day. Incidentally, FIG. 5 shows a table explaining the configuration of metadata of a medical data file.

The data storage term varies between the edge-side files and the edge file, depending on the file type and the frequency of access to the relevant file. For example, if the file type is "image information" and the file creation date is two years ago, the relevant data is migrated to Tier 2. If the file type is "patient information (age, name, etc.)" and the last access date of the file is one month ago, the relevant data is migrated to Tier 2. If the file type is "text data (such as notes)" and the file access frequency during the last one month is twice or less, the relevant data is migrated to Tier 2. In this way, which judgment standard should be applied is decided here for each file type.

The "edge-side policy files" are sort of original edge information collected from the edges. Since they are not best suited for the entire group of the edges, they are adjusted on the core side and a new value is written to the "edge policy file." For example, if the allocated capacity on the core side becomes deficient, the way of dealing with the problem is decided again on the core side according to the policy. If removing the file out to the lower tier as soon as possible is selected as the way of dealing with the above-described problem, the term for letting the file stay in Tier 1 will be reset to a shorter period of time as a result.

Next, the policy files for the core system 100 will be explained. FIG. 6 is a table explaining the outline of the policy files. As the policy files for the core-side system, there are a core-side basic policy file 1 (600), a core-side basic policy file 2 (602), and a copy file of a policy file 604 created on each edge side (FIG. 6), and an edge policy file 606 that is set by the core-side system for each edge. These files are put together as the policy file 312C and stored in the internal disk device 312.

The basic policy file 1 (600) describes a basic policy regarding storage of files on the core 100. This is set by the management terminal 110. An example of the basic policy file 1 (600) is shown in FIG. 7.

The basic policy file 1 is composed of blocks for setting of "core information" (storage capacity of each tier on the core side) (#1 to #3), blocks for setting of file storage terms (storage term for each tier on the core side and a total storage term by file type (#4 to #15), and a block for designation of policy execution time (#16) (when and at which time interval the file data should be migrated between the plurality of tiers is determined).

On the core side, the setting is made to set 10 years as the total storage term in consideration of the laws and regulations. On the edge side, it is unnecessary to give special consideration to how many years the data should be stored as a whole. The core side considers the whole group of the edges and adjusts an appropriate limited number of years of storage on the core.

The basic policy file 2 includes the storage capacity calculated from the edge-side policy (copy) file (604 in FIG. 6) collected by the core. FIG. 8 shows an example of the basic policy file 2. The basic policy file 2 sets, as edge information, the total capacity of the first tier of all the edges, the total capacity of the second tier of all the edges, and the total capacity of the third tier of all the edges.

The edge-side policy (copy) file is a copy of the edge-side policy file received by the core from each of the plurality of edges. The core-side file server 112 does not use this policy file for hierarchical management in the core's storage apparatuses 320, 322.

The edge policy file (606 in FIG. 6) is used by the core 100 to set a policy or a modified policy for each edge based on the policy (copy) file.

Hierarchical control of the data is executed by the file server or the storage apparatuses in the edges 102 and the core 100. The file server 112 or the storage apparatuses 320, 322 for the core 100 refer to each edge policy file for hierarchical control of the files. FIG. 9 shows an example of each edge policy file. "Edge information" includes an "edge name for identification of the relevant edge" (#1) and an "edge area"; and the "edge area" includes a block for an "edge directory name" (#2) created by the edge name and blocks for an "upper limit of the edge directory capacity of each tier" (#3 to #5).

Furthermore, a "file storage term" (#6 to #11) is to define a storage term of each tier with regard to the core-side storage area allocated to each edge. The storage term is decided for each piece of file basic information (FIG. 5) and file statistical information (FIG. 5).

Furthermore, an "action to be taken upon capacity shortage" (#12) indicates the content of processing on the core side upon shortage of the capacity of the allocated area for each edge. The content is similar to that on the edge side (as shown in FIG. 4).

Figure 10:
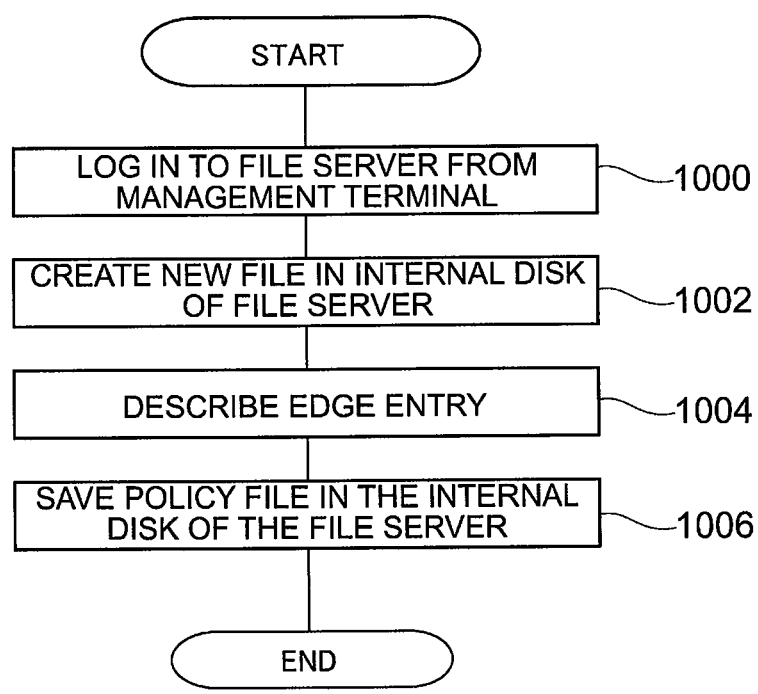
FIG. 10 is a flowchart illustrating the operation to create a new policy file on the edge side and the core side, respectively.

Next, the operation on the edge side and the core side will be explained. FIG. 10 is a flowchart illustrating the operation to create a new policy file on each of the edge 102 and the core 100.

The management terminal 106 (110) logs in to the file server 108 (110) (1000) and sets a new policy file to the internal disk 212 (312) for the file server 108 (110) (1002).

Next, the management terminal 106 (110) creates an entry for, for example, the edge in the new policy file and inputs a given value in each block of the policy file (1004). Subsequently, the management terminal 106 (110) stores the new policy file in the internal disk 212 (312) for the file server 108 (110) (1006).

Figure 11:
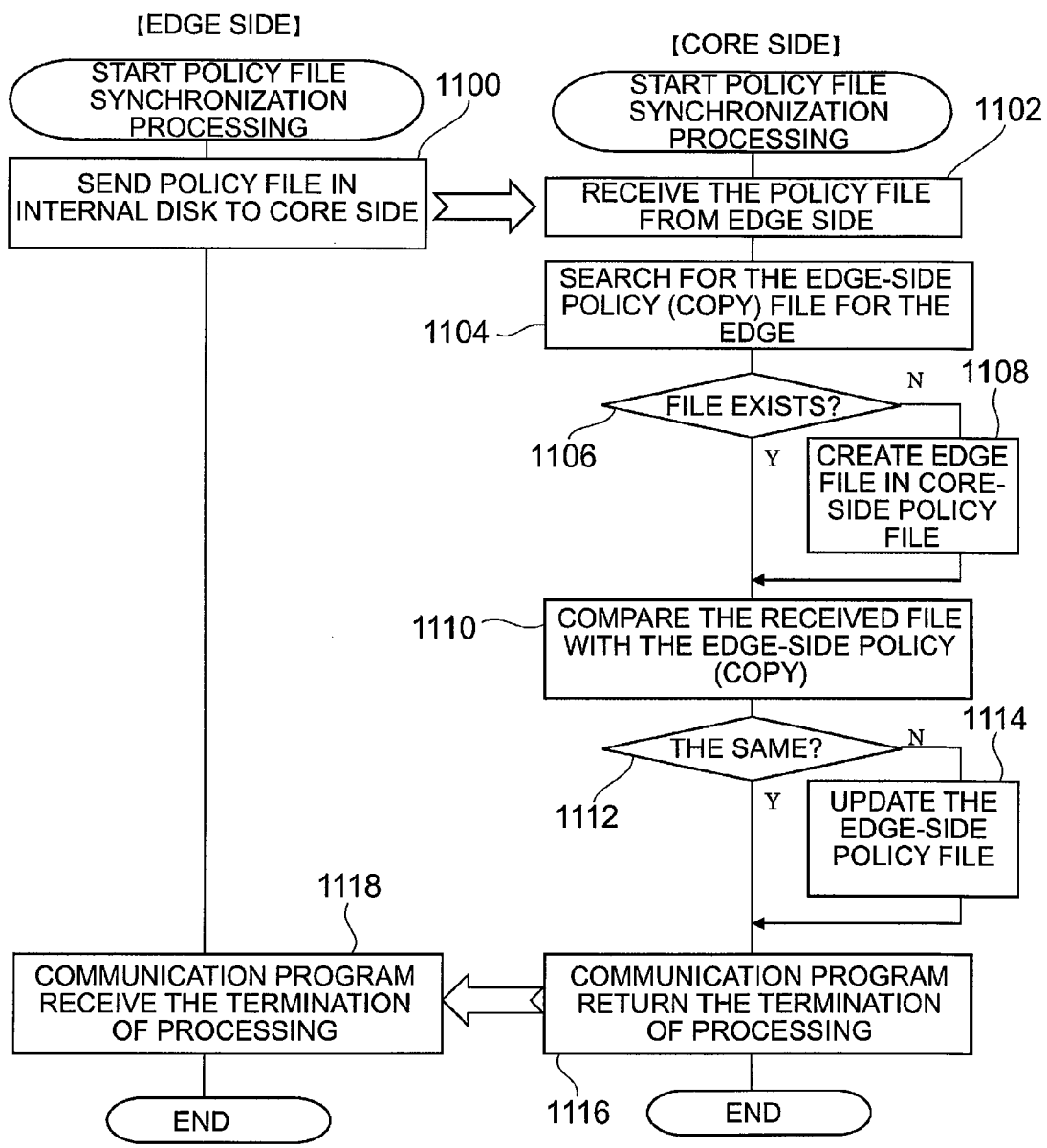
FIG. 11 is a flowchart illustrating the operation to apply a policy file created by the edge to the core.

The storage network system sends the edge-side policy file to the core at specified timing and synchronizes the policy files on both sides. This synchronization processing will be explained with reference to a flowchart in FIG. 11.

The arithmetic processing unit 210 for the edge 102 executes the data transmit-receive program 208B and sends the policy file 212C in the internal disk device 212 to the core 100 (1100). The arithmetic processing unit 310 for the file server 112 on the core 100 executes the data transmit-receive program 312C and receives the policy file from the edge 100 (1102).

The core-side arithmetic processing unit 310 executes the file management program 308A and searches the area 312C in the internal disk device 312 to find if a copied policy file that is stored in the internal disk 312 and is identical to the policy file of the sender edge exists in the area 312C (1104).

If the core-side arithmetic processing unit 310 returns a negative judgment (1106), it sets a copy of the policy file for the same edge to the core-side policy file 312C (1114).

On the other hand, if an affirmative judgment is returned (1106), the core-side arithmetic processing unit 310 compares the recently received policy file with the copied policy file; and if the recently received policy file and the copied policy file are the same (1112), the core-side communication program 308C sends termination of the synchronization processing (1116) to the edge-side communication program 208C (1118).

On the other hand, if there is any difference between the recently received policy file and the copied policy file, the core-side file management program 308A updates the copied edge-side policy file to incorporate this difference (1114).

The operation to set a core-side policy file based on an edge-side policy file will be explained with reference to a flowchart in FIG. 12. The core-side arithmetic processing unit 310 performs the processing illustrated in the flowchart shown in FIG. 12 by executing various programs. Incidentally, the following explanation will be given, assuming that edge 1 and edge 2 exist in the edge system. However, the existence of edge 3 or more edges will not be precluded.

Figure 12:
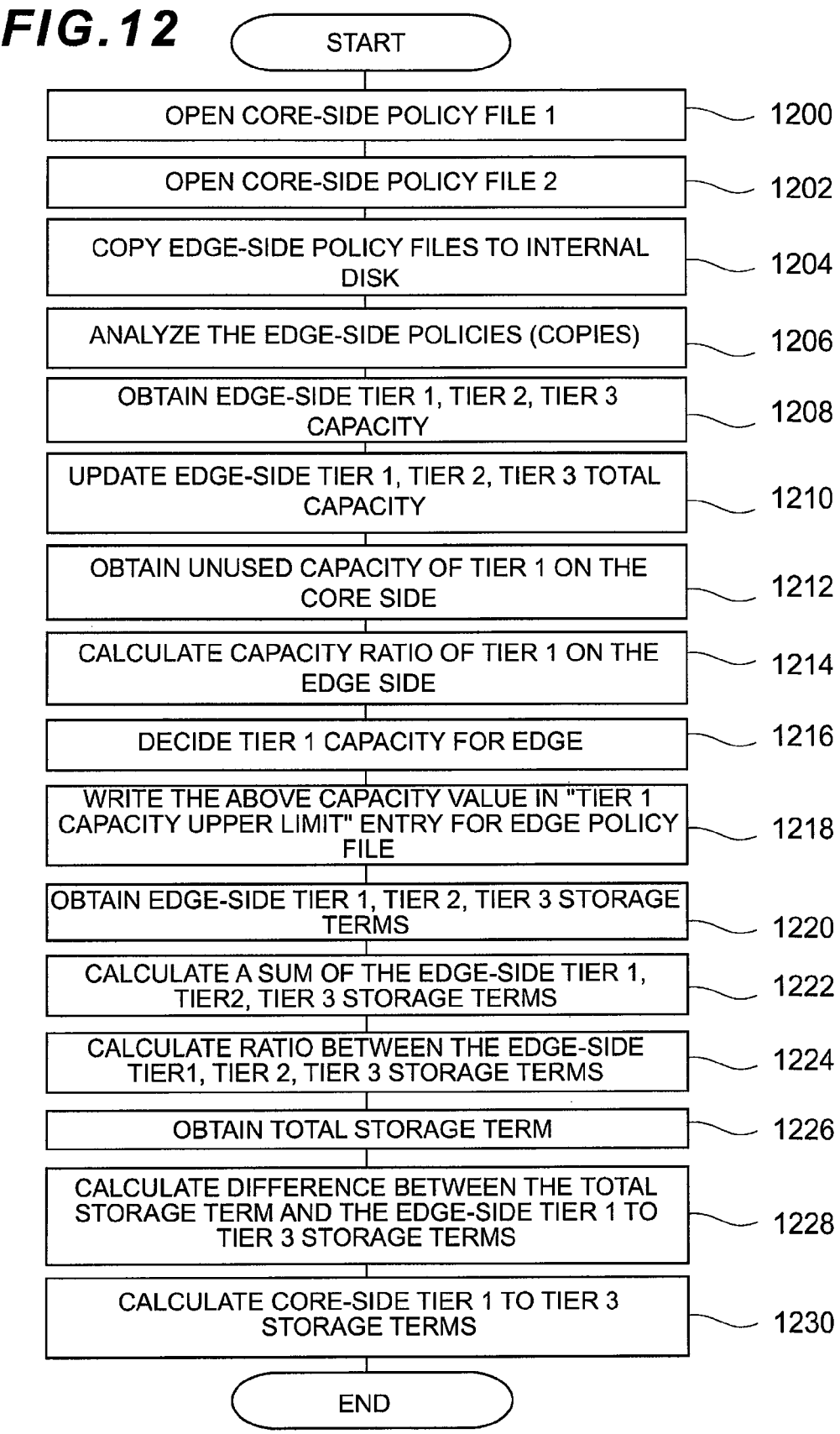
FIG. 12 is a flowchart illustrating the operation to create an edge policy file regarding an edge added to the core by applying an edge-side policy file to a core-side policy file.

The core sets a new edge policy by executing the flowchart shown in FIG. 12 every time a new edge is added to the core. The file management program 308A opens the core-side policy file 1 (FIG. 7) and the policy file 2 (FIG. 8) which are stored in the internal disk 312 (1200, 1202).

Next, the data transmit-receive program 308B receives the edge-side policy files from the plurality of edges already connected to the core and the edge newly connected to the core, that is, from all the edges and stores them as the edge-side policy (copy) files in the policy file storage area 312C in the internal disk 312 (1204). The above-described processing is performed because information about all the edge-side policy files, based on which the core sets an edge policy file for the edge newly added to the core 100, is necessary.

Next, the file management program 308A analyzes the copies of the edge-side policy files (1206) and obtains the capacity of the first tier, second tier, and third tier of each edge (1208). The file management program 308A then calculates the first tier total capacity, the second tier total capacity, and the third tier total capacity of all the edges and update the core-side policy file 2 (FIG. 8) based on the calculation result (1210).

The file management program 308A then issues a check command to the storage apparatus (core) 320 and obtains the unused capacity of the first tier (Tier 1) (1212). Next, the file management program 308A calculates a ratio (B/A) of the first tier capacity of the target tier added to the core 100 (B) to the first tier total capacity of all the edges (A) (1214).

Subsequently, the policy file read-write program 308F decides the capacity obtained by multiplying the unused first tier capacity of the core 100 by the ratio (B/A) to be the first tier capacity allocated to the target edge (1216).

The policy file read-write program 308F writes the above-decided capacity to the "first tier capacity upper limit" (#3) in the target edge policy file (FIG. 9) (1218). The above-described processing (1212 to 1216) is also executed for the second tier and other lower tiers.

As a result of the above-described steps, the core sets the core-side edge policy according to the edge-side policies. When doing so, the core decides the capacity allocated to each edge by associating the unused capacity of the core with the storage capacity allocation ratio between the plurality of edges. Therefore, when the policies for the plurality of edges are applied to the core, the policy differences between the plurality of edges may sometimes be buffered at the core.

After finishing the processing on all the tiers (1212 to 1216), the file management program 308A further analyzes the target-edge-side policy (copy) file and obtains the storage term of each tier for the target edge (1220).

The file management program 308A then calculates a total storage term of each tier (C) (1222) and calculates a ratio (D/C) of the storage term of each tier from the first tier to the third tier (D) to the total storage term of each tier (1224).

Furthermore, the file management program 308A obtains a required storage term (E) for data, which is often stipulated by law, from the core-side policy file 1 (FIG. 7) (1226).

Next, the file management program 308A calculates a difference (F) between the required storage term (E) and the total storage term of all the tiers of the target edge (C) (1228). The file management program 308A calculates a storage term of each tier for the target edge on the core side by multiplying the difference (F) by the ratio (D/C) and writes the obtained storage terms in the edge policy file 1 (#4 to #15 in FIG. 7) in the internal disk device 312 (1230).

Even if the plurality of edges have different data storage terms, the core can buffer the differences as a result of the above processing and it is thereby possible to comply with the required storage term which is required, for example, by law.

Incidentally, step 1206 to step 1218 may be applied not only to the target edge, but also to all the edges already connected to the core as well as the target edge. In the embodiment explained with reference to FIG. 12, the storage capacity allocated to the target edge is smaller than that allocated to the other existing edges already connected to the core. However, the storage capacity can be set equally to all the edges by executing the storage capacity allocation processing on all the edges.

Meanwhile, the flowchart shown in FIG. 12 may be applied to cases other than the addition of an edge to the core, that is, where the allocation of the storage capacity to the storage tiers and/or the storage terms are changed in the edges' policies.

Also, processing for returning the information on the core side, which has undergone the above-described processing, to the edge side and having the edge(s) rewrite its own policy file(s) based on the returned information may be executed.

Furthermore, processing for manually updating the core-side policy file shown in FIG. 6, FIG. 7, FIG. 8, and FIG. 9, then sending the updated information to the edge side, and having the edge rewrite its own policy file based on the received information may be executed.

Next, the operation to be performed upon shortage of the core's storage capacity when data is sent from the edge to the core will be explained with reference to a flowchart shown in FIG. 13. The data transmit-receive program 208B for the edge 102 sends a data file to the core 100 according to the relevant policy (1300).

When the file management program 308A for the core attempts to execute processing for storing the data file received from the edge in the first tier (Tier 1) of the storage apparatus 320 (1302), but detects that the first tier capacity of the core which is allocated to the sender edge is deficient (1304), the communication program 308C notifies the edge 100 of the first tier capacity shortage.

Furthermore, the communication program 308C notifies the management terminal 110 of the first tier capacity shortage so that the management terminal 100 will provide the administrator with output to prompt the addition of a storage disk (1308).

Next, the file management program 308A refers to the edge policy file (FIG. 9) for the edge which is the sender of the relevant data file (1310). The program 308A then checks the block for the action to be taken upon capacity shortage (#12 in FIG. 9) in the policy file and checks if the action to be taken upon capacity shortage includes a change of the data storage term (1312).

If the file management program 308A returns an affirmative judgment, it accesses the edge policy file (FIG. 9) for the data file sender edge, updates the policy file to shorten the storage term of the data file in the first tier (Tier 1) in the storage apparatus 320 on the core 100 according to the change rate designated by the policy file (1314), and relatively extends the storage term of the data file in the second tier (Tier 2) and/or the third tier (Tier 3).

If the file management program 308F determines that the action to be taken upon capacity shortage as indicated in the sender edge policy file is not a change of the storage term (1312), it checks based on the sender-edge policy file whether the capacity of the first tier (Tier 1) allocated to the data sender edge in the storage apparatus 320 can be changed or not (1316).

If an affirmative judgment is returned, the file management program 308A updates the edge policy file to increase the upper limit value of the first tier allocated capacity (#3) in the core-side storage apparatus for the sender edge according to the change rate which is set in the block for the action to be taken upon capacity shortage (#12) in the edge policy file for the sender edge (FIG. 9) (1318).

Incidentally, if step 1316 returns a negative judgment, the processing for extending the capacity on the core side is not executed and the situation is dealt with extension processing on the edge side as described later.

If the data transmit-receive program 208B for the edge receives an error of the first tier capacity shortage from the core 100 (1320), the file management program 208A for the edge 102 refers to its own policy file stored in the internal disk device 212 (1321).

Next, the data transmit-receive program 208B judges whether or not the data file from the edge 102 to the core 100 is transferred from the first tier of the edge (1322). If an affirmative judgment is returned, the edge-side data transmit-receive program 208B executes transmission of the data file again after completion of the processing step 1314 or 1318 on the core side.

On the other hand, if step 1322 returns a negative judgment, the data transmit-receive program 208B judges whether or not the data file is transferred from the second tier of the edge (1324). If step 1324 returns an affirmative judgment, the communication program 208A sends a command to the management terminal 106 for the edge to output a message prompting addition of a disk to the edge-side second tier to the administrator (1326).

Furthermore, the file management program 208A refers to its own policy file 212C (FIG. 4) and judges whether or not a change of the storage term is set to the block (#15) corresponding to the action to be taken upon capacity shortage on the edge side (1330). If step 1330 returns an affirmative judgment, the policy file read-write program 208F updates its own policy file to extend the storage term of the first tier (Tier 1) in the storage apparatus 220 according to the change rate set in the policy file (#15 in FIG. 4) (1332).

On the other hand, if the data file is not transferred from the second tier (Tier 2) in the storage apparatus 220, the communication program 208A sends a command to the management terminal 106 for the edge to output a message prompting addition of the storage capacity of the third tier (Tier 3) in the storage apparatus 222 to the administrator (1328).

Incidentally, if the storage capacity of the second tier or the third tier is added in steps 1326, 1328, it is possible to omit steps 1330, 1332.

Figure 13:
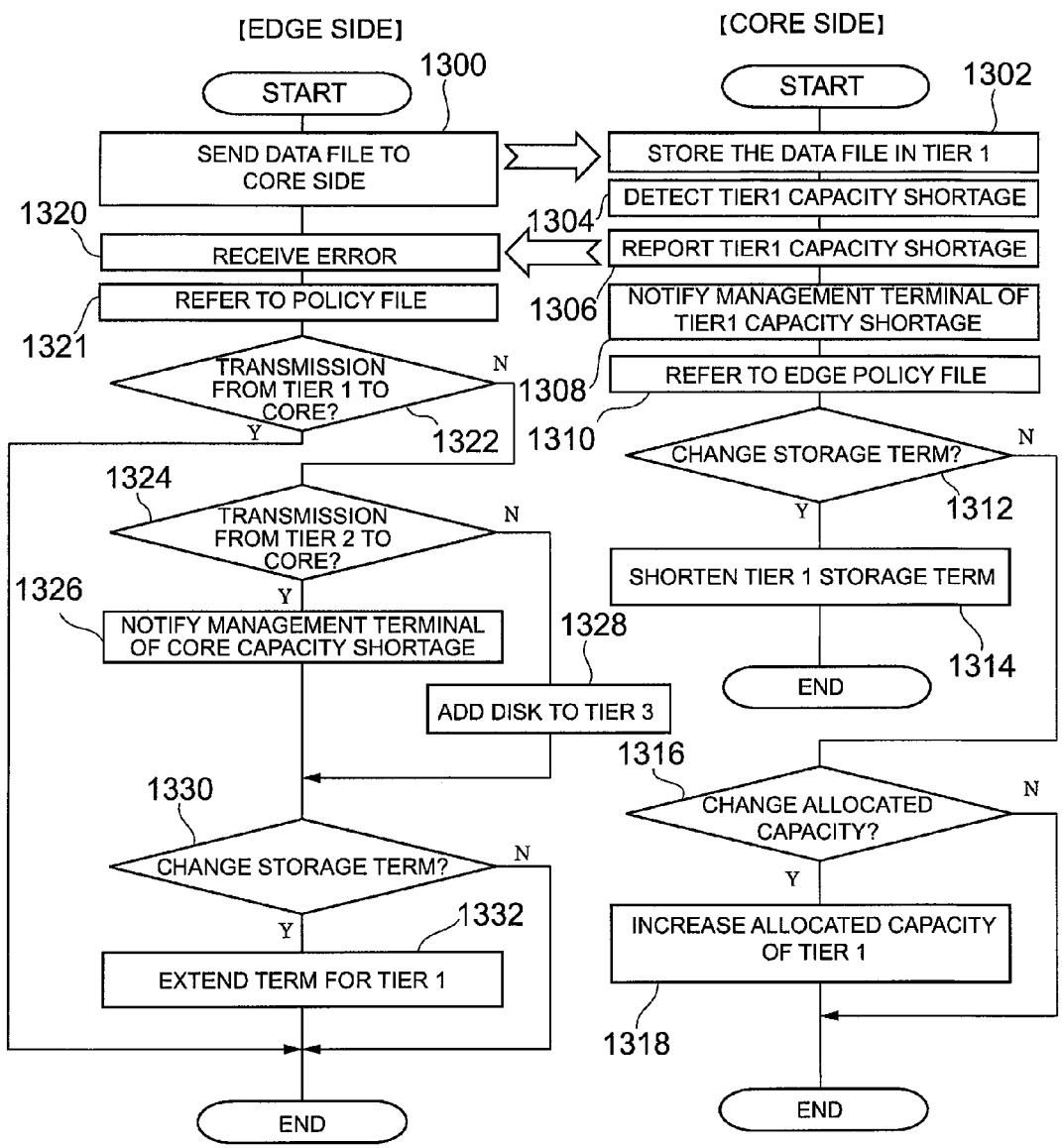
FIG. 13 is a flowchart illustrating the operation to be performed in a case of shortage of the core's storage capacity at the time of data transmission from the edge to the core.
Figure 14:
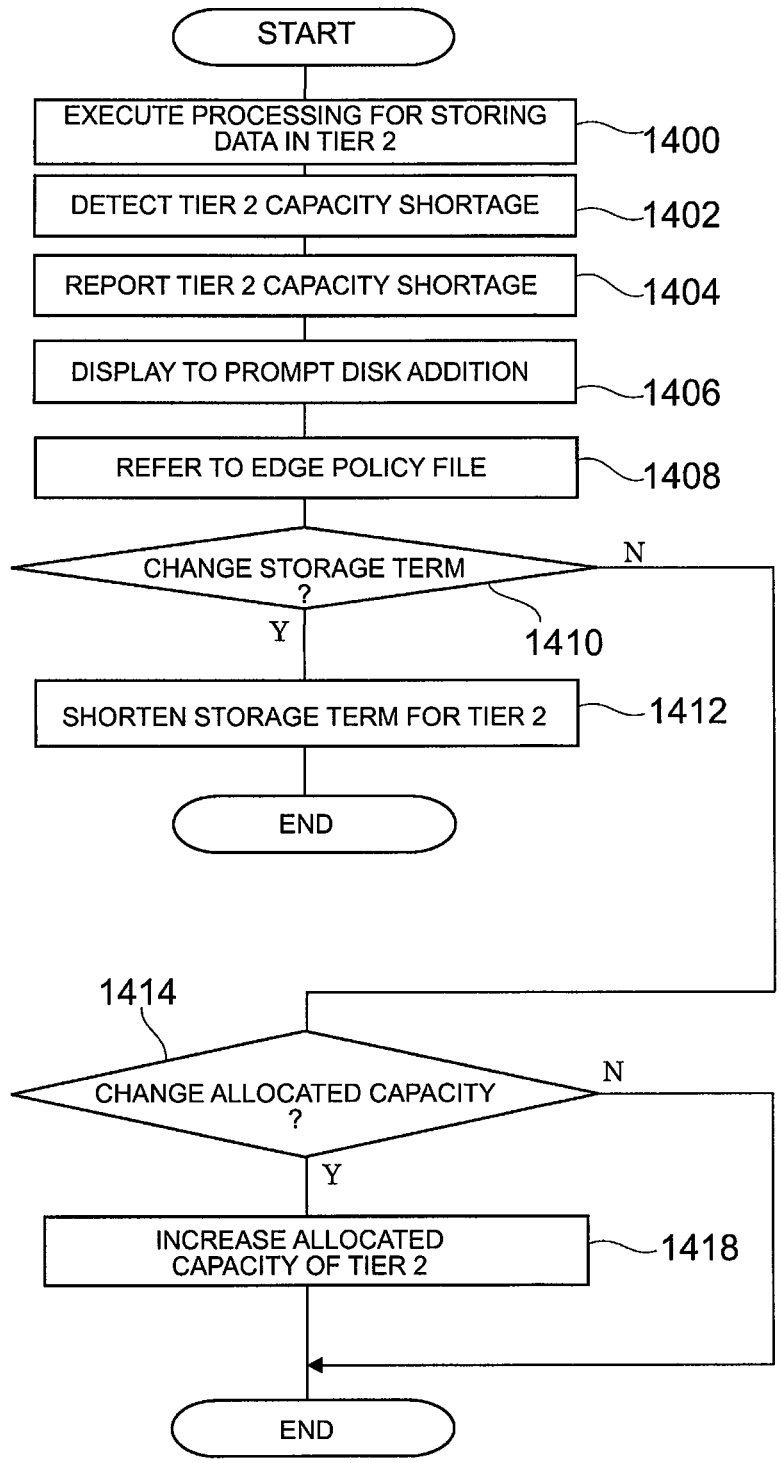
FIG. 14 is a flowchart illustrating the operation to be performed in a case of shortage of the second tier's and/or third tier's storage capacity on the core side during archive processing on the core side.

FIG. 13 explains processing to be executed upon shortage of the storage capacity of the first tier on the core side, which is allocated to the edge, during back-up processing from the edge to the core, while FIG. 14 is a flowchart illustrating the operation to be performed upon shortage of the core-side second tier and/or third tier during archive processing on the core side.

The core-side migration program 308E executes processing for migrating the data, which has been sent from the edge and backed up to the first tier (Tier 1) in the storage apparatus 320, to the second tier (Tier 2) (1400).

If the file management program 308A detects shortage of the storage capacity of the second tier allocated to the sender edge (#8 and #9 in FIG. 9) during the above-mentioned migration process (1402), the communication program 308C notifies the core-side management terminal 110 of the second tier storage capacity shortage (1404). After receiving this notice, the management terminal 110 executes output to prompt addition of a disk to the administrator (1406).

Next, the file management program 308A refers to the setting of the "action to be taken upon capacity shortage" (#12) in the edge policy file (FIG. 9) for the data file sender edge and checks whether or not the setting is made to allow a change of the storage term (1410). If an affirmative judgment is returned, the policy file read-write program 308F updates the edge policy file by shortening the data storage term of the second tier according to the change rate designated in the edge policy file (FIG. 9) (1412).

On the other hand, if the setting is not made to enable a change of the storage term (1410), the policy file read-write program 308F refers to the edge policy file in the same manner as in step 1412 and checks whether or not the setting is made to enable a change of the capacity allocation (1414). If this setting is made, the policy file read-write program 308F updates the relevant edge file to increate the allocation rate of the second tier (Tier 2 of the storage apparatus 320) to the data sender edge as compared to the allocation rates of other edges (1418).

Figure 15:
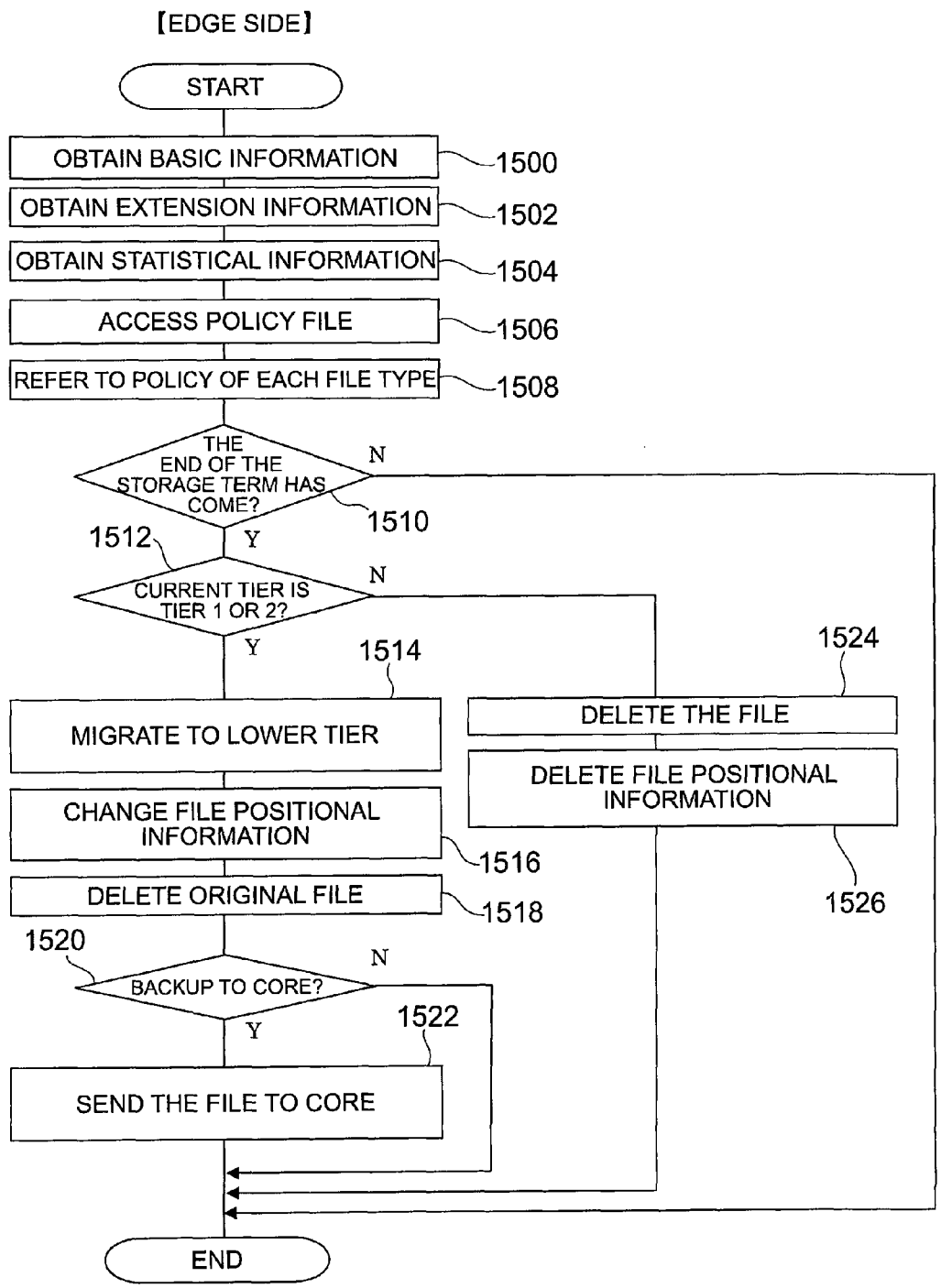
FIG. 15 is a flowchart illustrating archive processing on the edge and backup processing on the core.

Next, archive processing on the edge and backup processing on the core will be explained with reference to a flowchart shown in FIG. 15. The file management program 208A for the edge obtains basic information, extension information, and statistical information about the target file of the archive or backup processing from the edge-side storage apparatus in order to judge the importance level of the data file (1500 to 1504).

Next, the file management program 208A accesses the policy file (212C) (FIG. 4) (1506) and refers to the content of the policy file by the file type (1508). The file management program 208A judges based on the policy file whether or not the end of the storage term in the storage tier in which the data file is currently stored has come (1510). If an affirmative judgment is returned, the file management program 208A then judges whether the storage tier is either the first tier (Tier 1 in the storage apparatus 220) or the second tier (Tier 2) (1512).

If the storage tier is the third tier (Tier 3 in the storage apparatus 222), the file management program 208A recognizes that the file data has already been backed up to the core side; and then deletes the target file (1524).

The file management program 208A further deletes the file positional information 212B about the deleted file in the edge-side internal disk 212 (1526).

On the other hand, if the file management program 208A determines that the storage tier is the first tier or the second tier, the migration program 208E migrates the target file to a lower tier (1514). The file positional information management program 208D changes the file positional information 212B in the internal disk 212 to indicate the migration of the target file from the upper tier to the lower tier (1516).

Next, after the migration program 208E deletes the original file in the upper tier (1518), the file management program 208A judges, based on the block for the policy file execution time (#17) in the policy file 212C (FIG. 4), whether or not the target file should be backed up to the core-side storage apparatus (1520). If an affirmative judgment is returned, the data transmit-receive program 308B sends the target file to the file server 112 for the core 100 for the backup purpose (1522).

Figure 16:
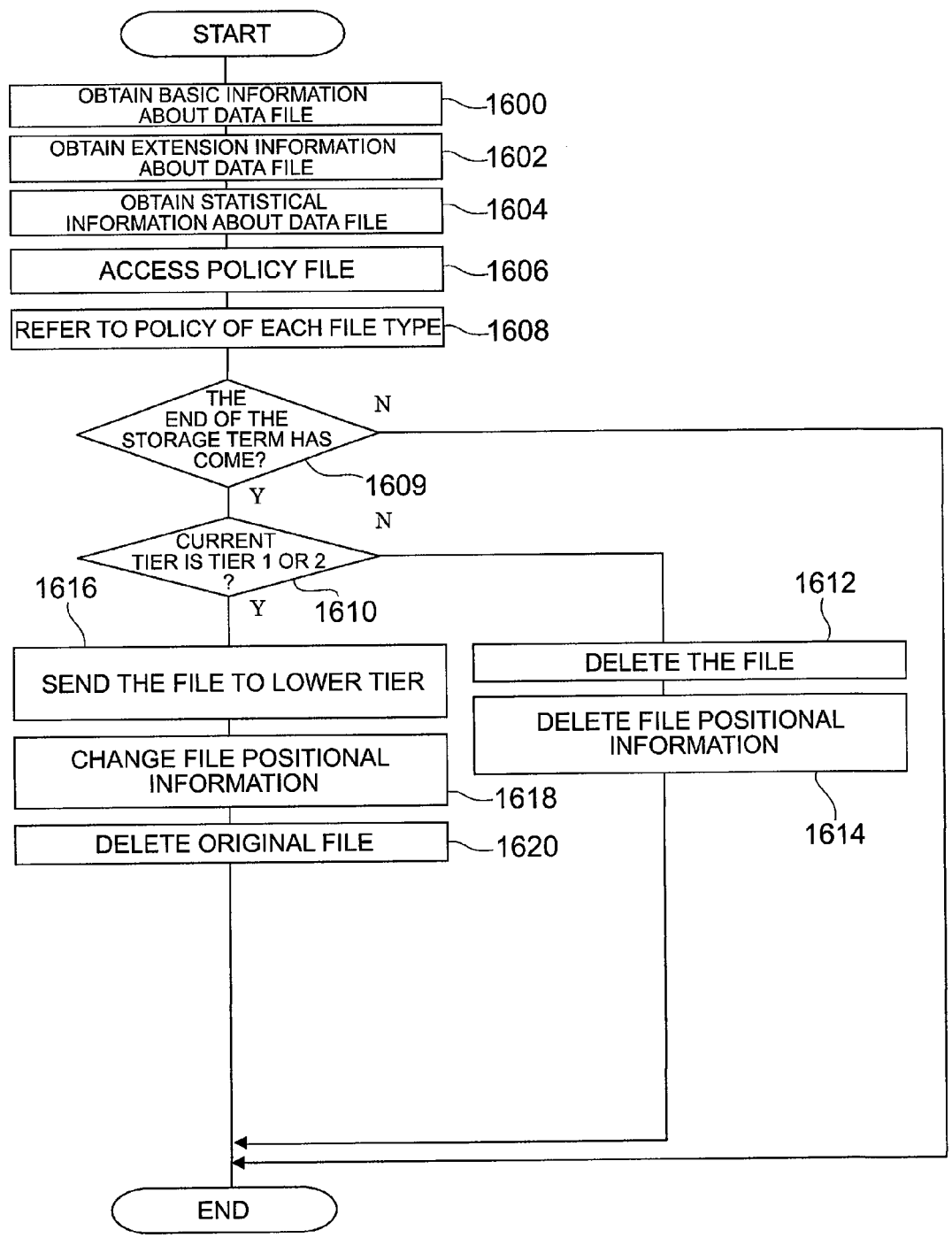
FIG. 16 is a flowchart illustrating archive processing on the core side.

Next, the core-side archive processing will be explained with reference to FIG. 16. The core-side file management program 308A obtains the basic information, the extension information, and the statistical information about the target file for the archive or backup processing from the core-side storage apparatus 320, 322 in order to judge the importance level of the data file (1600 to 1604).

Subsequently, the file management program 308A accesses the policy file 312C (FIG. 7) (1606), judges the file type, and refers to the policy of the policy file which is set by the file type (#4 to #15 in FIG. 7) (1608).

The file management program 308A judges based on the policy file whether the end of the storage term of the storage tier in which the relevant file is currently stored has come with regard to the data file on which the archive processing is to be executed (1609). If an affirmative judgment is returned, the file management program 308A judges whether or not the storage tier is either the first tier (Tier 1 in the storage apparatus 320) or the second tier (Tier 2) (1610).

If the storage tier is the third tier (Tier 3 in the storage apparatus 322, the file management program 308A recognizes that it is unnecessary to store the data file and then deletes the target file (1612). The file management program 308A further deletes the file positional information 312B in the internal disk 312 (1614).

On the other hand, if the file management program 308A determines that the storage tier is the first tier or the second tier, the migration program 308E migrates the target file to a lower tier (1616). The file positional information management program 308D changes the file positional information 312B in the internal disk 212 to indicate the migration of the target file from the upper tier to the lower tier (1618). Then, the migration program 308E deletes the original file in the upper tier (1620).

Figure 17:
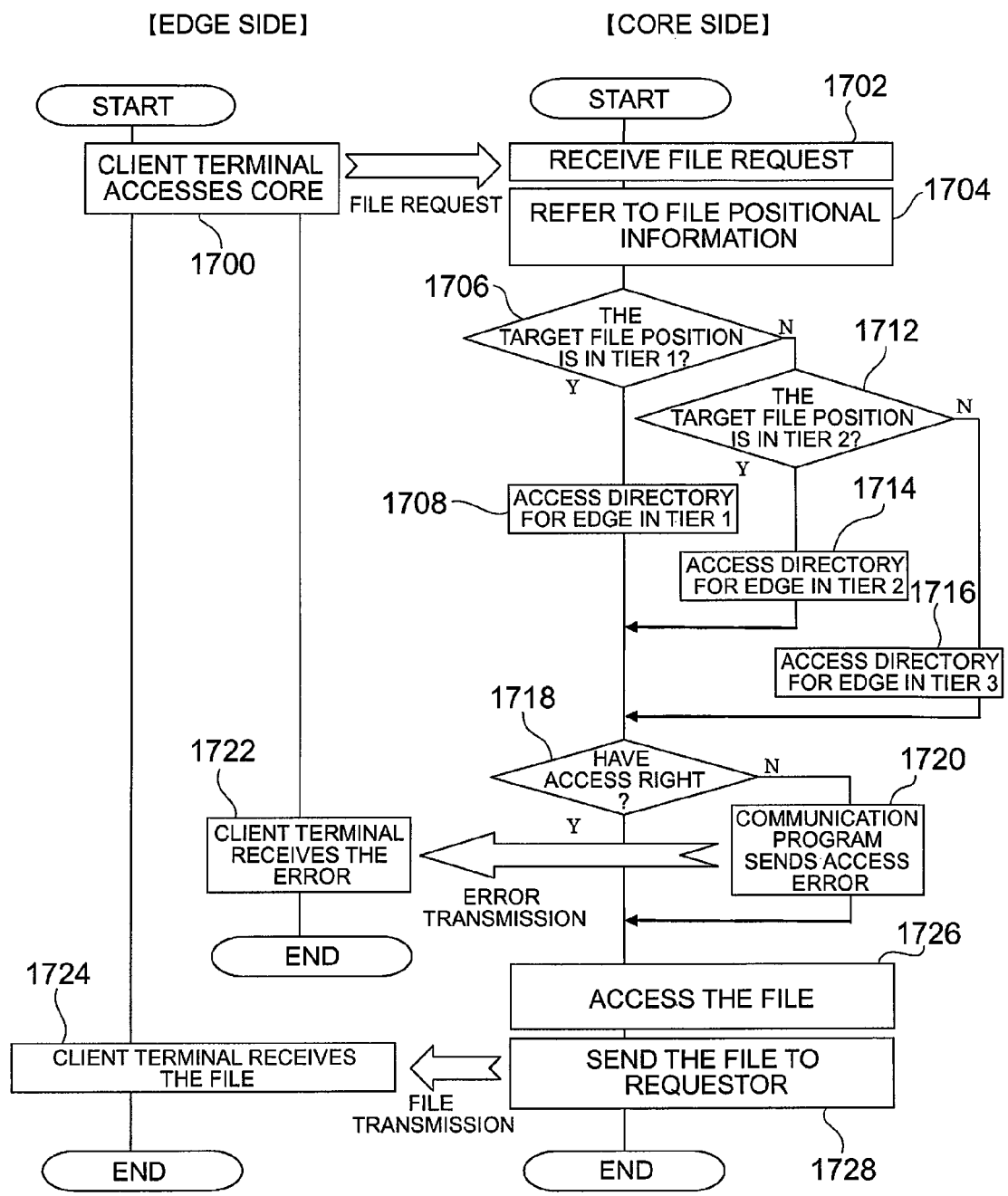
FIG. 17 is a flowchart illustrating the operation performed by the edge to refer to data in the core.

The operation executed by the edge to refer to data in the core will be explained with reference to a flowchart shown in FIG. 17. The client terminal 104 accesses the file server for a specific edge according to the edge name and further designates the file name under control of the directory. If the edge-side file management program 208A refers to the file positional information 212B in the internal disk 212 and determines that the target file exists in the storage apparatus 320, 322 for the core 100, the data transmit-receive program 208B for the edge sends a command to the file server 112 for the core to request the file data (1700).

After the core-side communication program 308C receives this command (1702), the file positional information management program 308D for the core refers to the file positional information 312B in the internal disk; judges whether the target file position is in the first tier (Tier 1) or the second tier (Tier 2) in the storage apparatus 320, or in the third tier (Tier 3 in the storage apparatus 322); and then accesses the directory for the requester edge in the target tier (1706 to 1716).

Subsequently, the file management program 308A for the core judges whether the requester edge has an access right to the target file or not (1718). If it is determined that the requester edge does not have the access right, the core-side communication program 308C sends an access error to the file server 108 for the requester edge (1720). When the data transmit-receive program 208B receives this error result, the client terminal 104 receives the error via the communication program 208C (1722).

If the file management program 308A determines that the requester edge has the access right, the file management program 308A accesses the target file under the directory (1726), and the data transmit-receive program 308B sends the target file to the file server 108 for the requester edge (1728). The edge-side communication program 208C sends the target file data to the client terminal 104 (1724).

Figure 18:
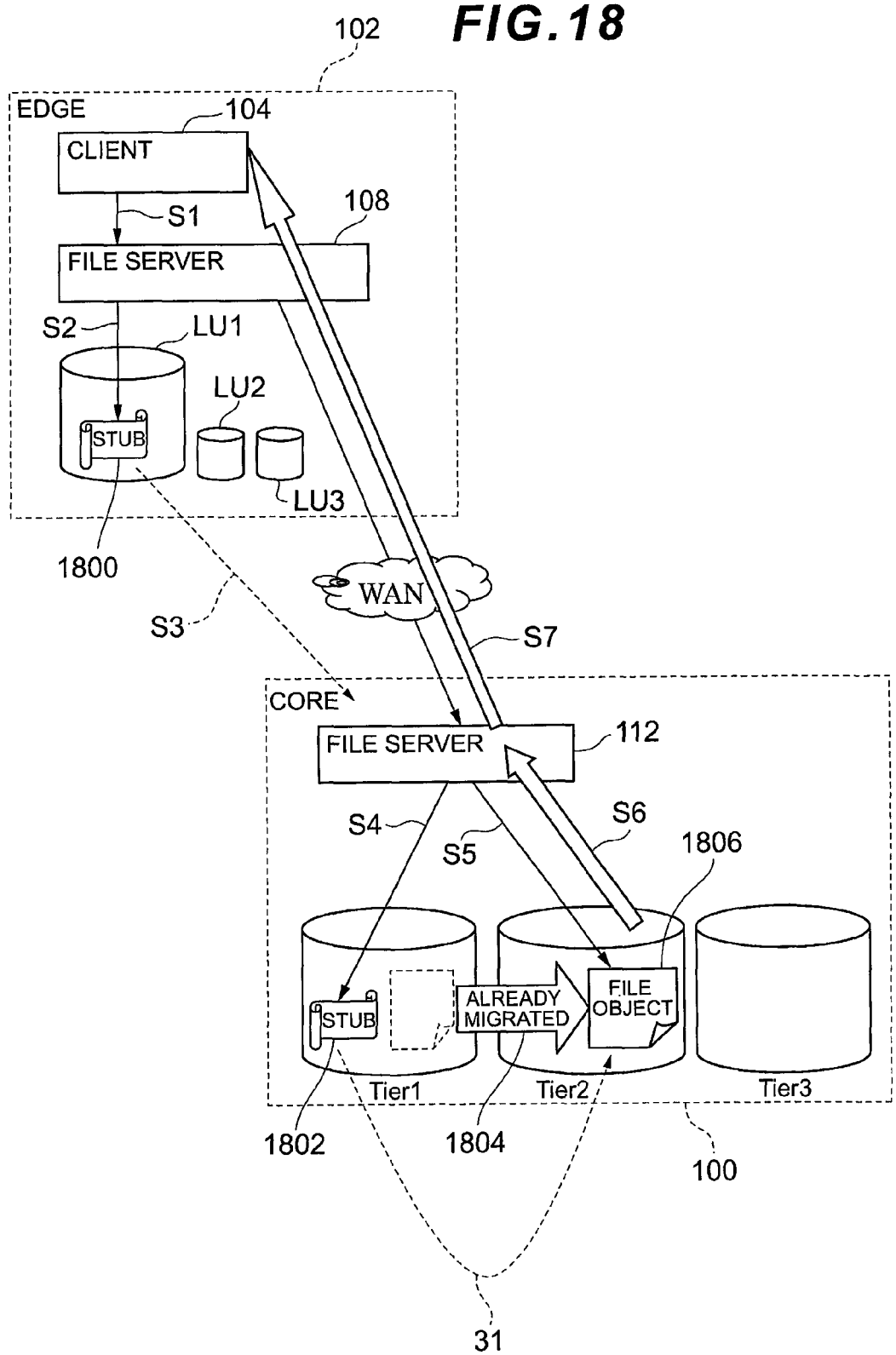
FIG. 18 is a block diagram of a storage network system when an edge accesses its own backup data.

The details of the file positional management operation when the edge accesses core data will be explained below. FIG. 18 is a block diagram of the storage network system when the edge 102 accesses its own backup data in the core. When the client 104 for the edge first makes a request for a file to the file server 108 (S1), the file server 108 detects a stub 1800 in Tire 1 (S2). Next, the edge accesses the core 100 according to positional information of the stub (S3).

When the file server 112 for the core searches for the file in Tire 1, it detects a stub 1802 (S4). Since a file object 1806 has been migrated from Tire 1 to Tire 2 (1804), the file server 112 accesses the file object in Tier 2 in accordance with positional information J1 of the stub (S5). The file server 112 reads the file from the LU (Tire 2) (S6) and transfers it to the file server 108 for the edge, and the client 104 obtains the file from the edge.

FIG. 19 is a block diagram showing a case where the edge accesses backup data of another edge. The file server for the core exports the directory from Tire 1 (S8) and makes the file information shared by a plurality of edges. Subsequently, the client 104 accesses the file server 112 for the core via the WAN (S9).

The file server 112 searches for the file in Tire 1 and detects the stub 1802 (S10) and accesses the file object 1806 in accordance with the positional information (J1) of the stub (S12). Next, the file server 112 reads the file from Tire 2 (S14) and transfers the file to the edge 102, so that the client can obtain it.

The invention claimed is:

1. A storage network system with a plurality of edges connected to a core and at least one of the plurality of edges connected to a computer device, the storage network system comprising:
a first storage system constituting one of the plurality of edges connected to the computer device;
a second storage system constituting the core; and
a communication path for connecting the first storage system with the second storage system;
wherein the first storage system includes:
a first storage apparatus having a plurality of tiers for storing first data sent from the computer device; and
a first storage control device for controlling the first data based on a first policy specifying hierarchical storage management (HSM) of the first data in the first storage apparatus, the first policy including a capacity and a storage term of each of the tiers of the first storage apparatus;
wherein the second storage system includes:
a second storage apparatus having a plurality of tiers for storing second data comprised of backup data of the first data; and a second storage control device for controlling the second data based on a second policy specifying HSM of the second data in the second storage apparatus, the second policy including a capacity and a storage term of each of the tiers of the second storage apparatus; and wherein the first storage control device sends the first data to the second storage control device to be stored as the second data, when receiving the first data from the first storage control device, if the second storage control device detects a capacity shortage of a first tier of the second storage apparatus to which the second data is to be stored, the first storage control device updates the first policy to extend the storage term for a first tier of the first storage apparatus, and wherein the first storage control device sends the first policy to the second storage control device, and the second storage control device updates the second policy based on the received first policy.

2. The storage network system according to claim 1, wherein the second policy is comprised of:

a basic policy file specifying a basic policy for the core;

a copy file of policies of the plurality of edges including the first policy created by the first storage system constituting the one of the plurality of edges; and an edge policy file set by the second storage control device for each of the plurality of edges based on the basic policy file and the copy file.

3. The storage network system according to claim 1, wherein the first policy has a storage capacity of each tier in the first storage apparatus and a storage term of the first data in each tier; and the second policy has a storage capacity of each tier in the second storage apparatus and a storage term of the second data in each tier.

4. The storage network system according to claim 1, wherein if the second storage control device detects, upon receiving the first data from the first storage control device, the capacity shortage of the first tier of the second storage apparatus to which the first data is to be transferred, the second storage control device shortens the storage term of the second data in the first tier based on the second policy and sets the second policy to migrate the second data from the first tier to a second tier.

5. The storage network system according to claim 1, wherein if the second storage control device detects, upon receiving the first data from the first storage control device, the capacity shortage of the first tier of the second storage apparatus to which the first data is to be transferred, the second storage control device sets the second policy to increase allocation of the storage capacity of the first tier to the one of the edges from which the first data is transferred, according to a change rate set in the first policy of the one of the edges from which the first data is transferred.

6. The storage network system according to claim 1, wherein the first storage control device sends the updated first policy to the second storage control device, and the second storage control device updates the second policy based on the received updated first policy.

7. A data control method for a storage network system comprising:

a plurality of edges connected to a core, wherein a first storage apparatus having a plurality of tiers for storing first data where the first storage apparatus is included at one of the plurality of edges, and a second storage apparatus having a plurality of tiers for storing second data comprised of backup data of the first data where the second storage apparatus is included at the core, the data control method comprising:

setting a first policy that specifies hierarchical storage management (HSM) of the first data, the first policy including a capacity and a storage term of each of the tiers of the first storage apparatus, and setting a second policy specifying HSM of the second data in the core, the second policy including a capacity and a storage term of each of the tiers of the second storage apparatus;

sending the first data from the one of the edges to the core to be stored as the second data;

detecting whether a capacity shortage of a first tier of the second storage apparatus exists;

upon detecting the capacity shortage of the first tier of the second storage apparatus, updating the first policy to extend the storage term for a first tier of the first storage apparatus;

sending the updated first policy to the core; and upon receiving the updated first policy at the core, updating the second policy based on the updated first policy.

8. The data control method according to claim 7, wherein the second policy is comprised of:

a basic policy file specifying a basic policy for the core;

a copy file of policies of the plurality of edges including the first policy created by the first storage system constituting the one of the plurality of edges; and an edge policy file set by the second storage control device for each of the plurality of edges based on the basic policy file and the copy file.

9. The data control method according to claim 7, wherein the first policy has a storage capacity of each tier in the first storage apparatus and a storage term of the first data in each tier; and the second policy has a storage capacity of each tier in the second storage apparatus and a storage term of the second data in each tier.

10. The data control method according to claim 7, further comprising:

upon detecting the capacity shortage of the first tier of the second storage apparatus, shortening a storage term of the second data in the first tier based on the second policy; and setting the second policy to migrate the second data from the first tier to a second tier.

11. The data control method according to claim 7, further comprising:

upon detecting the capacity shortage of the first tier of the second storage apparatus, setting the second policy to increase allocation of the storage capacity of the first tier to the one of the edges from which the first data is sent, according to a change rate set in the first policy of the one of the edges from which the first data is sent.

* * * * *